US011289110B2

(12) United States Patent
Zheng et al.

(10) Patent No.: US 11,289,110 B2
(45) Date of Patent: Mar. 29, 2022

(54) METHOD AND DEVICE FOR AUDIO SIGNAL PROCESSING, AND STORAGE MEDIUM

(71) Applicant: AAC Technologies Pte. Ltd., Singapore (SG)

(72) Inventors: Yajun Zheng, Shenzhen (CN); Hanlin Deng, Shenzhen (CN); Xiang Lu, Shenzhen (CN); Yulei Zhang, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 223 days.

(21) Appl. No.: 16/703,907

(22) Filed: Dec. 5, 2019

(65) Prior Publication Data

US 2020/0211577 A1  Jul. 2, 2020

(30) Foreign Application Priority Data

Dec. 31, 2018  (CN) .......................... 201811651551.9

(51) Int. Cl.
*G10L 25/48* (2013.01)
*G06F 40/205* (2020.01)
*G10L 21/16* (2013.01)
*G06F 3/16* (2006.01)
*G06F 3/0488* (2013.01)
*G10L 21/18* (2013.01)

(52) U.S. Cl.
CPC ............ *G10L 25/48* (2013.01); *G06F 3/0488* (2013.01); *G06F 3/167* (2013.01); *G06F 40/205* (2020.01); *G10L 21/16* (2013.01); *G10L 21/18* (2013.01)

(58) Field of Classification Search
CPC ....... G06F 3/167; G06F 3/0488; G10L 21/16; G10L 21/18
See application file for complete search history.

(56) References Cited

U.S. PATENT DOCUMENTS

| | | | | |
|---|---|---|---|---|
| 2004/0161118 | A1* | 8/2004 | Chu | G10H 1/36 381/61 |
| 2009/0093896 | A1* | 4/2009 | Kobayashi | G10L 25/90 700/94 |
| 2010/0286806 | A1* | 11/2010 | Booth | H04R 5/04 700/94 |
| 2011/0102160 | A1* | 5/2011 | Heubel | G06F 3/011 340/407.1 |
| 2012/0206247 | A1* | 8/2012 | Bhatia | G06F 3/167 340/407.1 |
| 2013/0163785 | A1* | 6/2013 | Lee | H04R 3/14 381/103 |

(Continued)

*Primary Examiner* — Samuel G Neway
(74) *Attorney, Agent, or Firm* — W&G Law Group

(57) ABSTRACT

A method and device for audio signal processing is provided. The method includes steps of: obtaining an inputted audio signal; parsing the audio signal to obtain at least one audio feature; determining at least one vibration feature corresponding to the at least one audio feature; and generating a vibration signal corresponding to the audio signal according to the at least one vibration feature. The inputted audio signal is automatically converted into a vibration signal by the vibration feature corresponding to the audio feature of the inputted audio signal, which can avoid errors caused by manual operation and make the vibration signal possess high versatility.

5 Claims, 5 Drawing Sheets

(56) References Cited

U.S. PATENT DOCUMENTS

| | | | |
|---|---|---|---|
| 2013/0265286 A1* | 10/2013 | Da Costa | G06F 3/016 345/177 |
| 2014/0167940 A1* | 6/2014 | Choi | G08B 1/08 340/407.1 |
| 2015/0070147 A1* | 3/2015 | Cruz-Hernandez | G06F 3/165 340/407.1 |
| 2015/0070261 A1* | 3/2015 | Saboune | G06F 3/016 345/156 |
| 2015/0154966 A1* | 6/2015 | Bharitkar | G08B 6/00 381/23 |
| 2016/0027264 A1* | 1/2016 | Choi | G08B 6/00 340/407.1 |
| 2017/0213568 A1* | 7/2017 | Foshee | G10L 21/16 |
| 2019/0108852 A1* | 4/2019 | Eagleman | G10L 15/02 |
| 2019/0215349 A1* | 7/2019 | Adams | A63F 13/285 |
| 2020/0086892 A1* | 3/2020 | Alequin | G06F 3/165 |
| 2020/0211577 A1* | 7/2020 | Zheng | G10H 1/40 |
| 2021/0074263 A1* | 3/2021 | Malone | G06F 3/016 |

\* cited by examiner

METHOD AND DEVICE FOR AUDIO SIGNAL PROCESSING, AND STORAGE MEDIUM

TECHNICAL FIELD

The present disclosure relates to the technical field of signal processing, and in particular, to a method and device for method for audio signal processing, and a storage medium.

BACKGROUND

At present, with a rapid development of intelligent electronic devices, the user's sensory experience brought by intelligent electronic devices is becoming more and more demanding. In addition to a traditional visual and auditory experience, a vibration experience in a haptic experience has been gradually accepted by users. In some smart touch electronic devices, such as cellphones, game devices, tablet computers and the like, some products have been provided with a function of vibration experience, which is an important evaluation indicator in the user experience. Commonly used vibration experiences are usually applied to information reminders, such as an information reception, a call notification, an alarm clocks, and a trip reminder in a calendar, and are also applied to interactive experiences in games and movies.

The inventors of the present disclosure have found that at least following problems exist in the prior art. A sensory experience brought by the above-mentioned vibration experience to the user is still very limited, for example, a vibration melody applied to a notification and a timer reminder is simple, and thus the user is prone to numbness after a long time of use. As a result, the user has a slow response to vibration of the device, thereby reducing efficiency of the device in delivering information. Moreover, in terms of the interactive experience in games and movies, the vibration is mainly based on manually matching the vibration signal according to the sense of hearing. This method is inefficient and subject to subjective factors, and has high requirements on individual person who configures vibration, and thus this method cannot be universally applied.

BRIEF DESCRIPTION OF DRAWINGS

Many aspects of exemplary embodiment can be better understood with reference to following drawings. Components in the drawings are not necessarily drawn to scale, the emphasis instead being placed upon clearly illustrating principles of the present disclosure. Moreover, in the drawings, like reference numerals designate corresponding parts throughout the several views.

DESCRIPTION OF EMBODIMENTS

The present disclosure will be further illustrated with reference to the accompanying drawings and the embodiments.

A first embodiment of the present disclosure relates to a method for audio signal processing. An inputted audio signal is automatically converted into a vibration signal according to a vibration feature corresponding to an audio feature of the inputted audio signal, thereby avoiding errors caused by manual operation and making the vibration signal to possess high versatility.

Implementation details of the method for audio signal processing in this embodiment are specifically described in the following. It should be noted that the following is only for better illustrating the implementation details of the present solution, and is not necessary for implementing the present solution.

Figure 1:
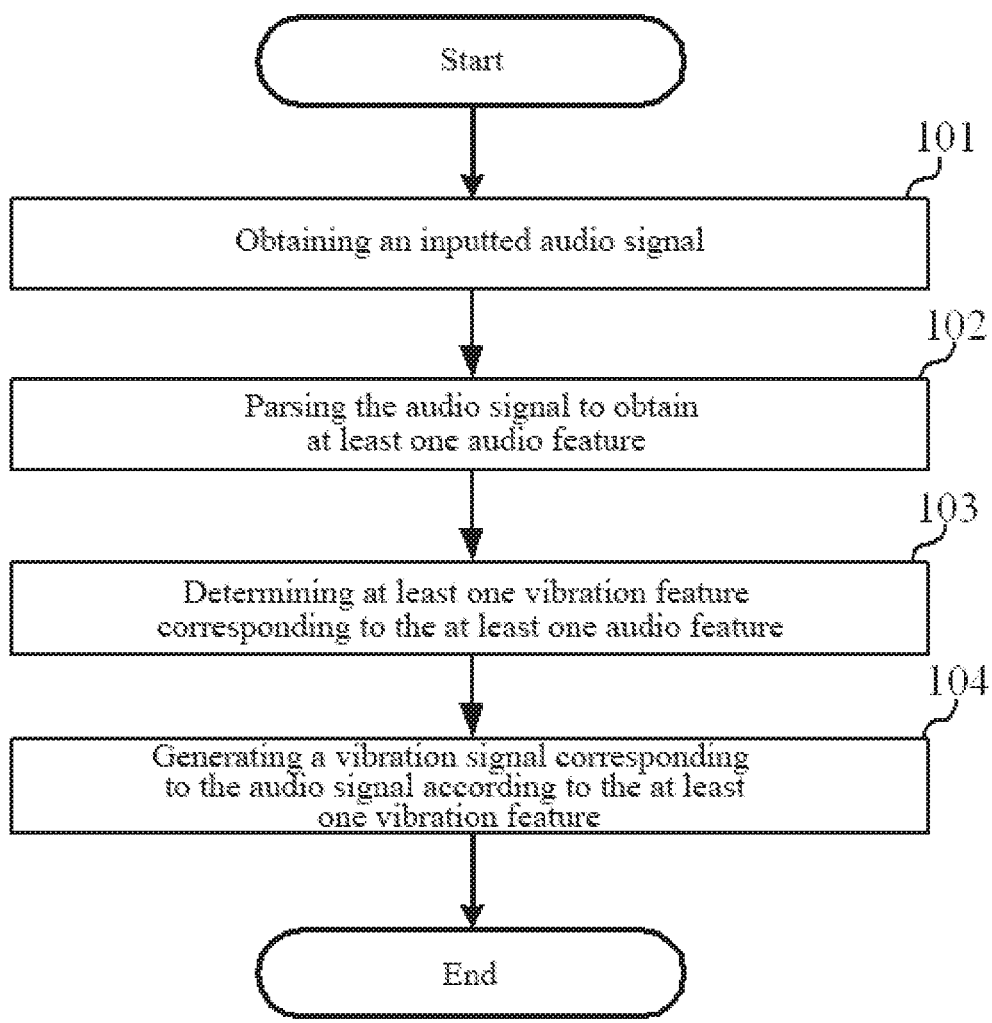
FIG. 1 is a flow block diagram of a method for audio signal processing according to a first embodiment of the present disclosure.

FIG. 1 is a flow chart of a method for audio signal processing according to the first embodiment, and the method may include following steps.

At step 101, an inputted audio signal is obtained.

It should be noted that the inputted audio signal can be stored in audio files of various formats, for example, the audio signals contained in the audio files with the suffixes such as way, ogg, mp3, flac, aiff, aifc, au are obtained. A multi-track audio has substantially the same single-signal feature on multiple tracks, therefore in an analysis process, it is only required that a signal on only one track of the audio file is extracted as the inputted audio signal.

At step 102, the audio signal is parsed to obtain at least one audio feature of the audio signal.

The at least one audio feature includes at least one of a beat duration, a note percentage, an audio intensity, an audio roughness, and an intensity peak of the audio signal. It should be noted that the audio feature may also include other parameter, and the descriptions herein are merely illustrative examples, which shall not limit the scope of the present disclosure.

In an implementation manner, the inputted audio signal is parsed according to customers' needs, and at least one of the beat duration, the note ratio, the audio intensity, the audio roughness, and the intensity peak of the audio signal can be obtained. For example, in terms of music, the beat duration and the note ratio of the audio signal can be obtained through knowledge of the music theory to meet customers' needs.

An implementation process of parsing the audio signal to obtain the audio feature is as follows: after the audio signal is divided into segments, a speed, a number of notes and a spectral relationship of each segment of audio signal are respectively calculated; a respective beat duration of each segment of audio signal is determined respectively according to the speed of each segment of audio signal; and/or, a respective note ratio of each segment of audio signal is determined respectively according to the number of notes of each segment of audio signal and the duration of each segment of audio signal; and/or a respective audio intensity of each segment of audio signal is determined respectively according to the spectral relationship of each segment of audio signal; and/or a respective audio roughness of each segment of audio signal is determined respectively according to the spectral relationship of each segment of audio signal; and/or a respective intensity peak of each segment of audio signal is determined respectively according to a total number of frames of each segment of audio signal and an intensity peak ratio of each segment of audio signal.

In an implementation manner, combined with relevant knowledge of music theory, a speed, a number of notes and a spectral relationship of each segment of audio signal are respectively calculated. For example, the speed, the number of notes of the audio signal can be obtained and analyzed according to the energy feature and the spectrum feature; the spectral relationship of the audio signal can be obtained by Fourier transforming the audio signal; the beat duration can be obtained by dividing unit time by the music speed; the note ratio can be obtained by dividing the number of notes by a total duration of the audio.

In an implementation manner, an entire audio signal is framed, and then spectrum analysis is performed on each frame to obtain correlation coefficients, such as an amplitude of the audio signal, a frequency of the audio signal, etc. Then, these coefficients are put into corresponding calculation formulas to obtain the audio intensity and audio roughness of each frame.

The audio intensity can be obtained according to the following formula:

$$L_a = C \sum_{f=25}^{F} \frac{1}{\alpha_f} 20 \log_{10}(cx_f).$$

Here, $x_f$ is the amplitude of the audio signal. F is the highest frequency, and the coefficient C corresponds to the highest frequency F, where a correspondence therebetween can be referred to the standard ISO266:2003. For example, in a case of F=6400 Hz, the coefficient C=0.065 is obtained by referring to the standard IS0266:2003. $\alpha_f$ is a sound pressure level of an equal-loudness curve with respect to the frequency f. c is a metric constant, which is set according to an audio sampling type, for example, for a typical 16-bit integer sampling, c is equal to 1.37.

After performing a mixing frequency process on each segment of audio signal, a quantification calculation is performed based on a human ear's perception of the audio signal after the mixing frequency process, and then the audio roughness of the audio signal is obtained. The calculation is performed according to the following formula:

$$R = \frac{(x_m x_M)^{0.1}}{2} \left( \frac{2x_m}{x_m + x_M} \right)^{3.11} (e^{-3.5 s f_d} - e^{-5.75 s f_d}).$$

Here, $f_1$ and $f_2$ are any two frequency values among a specified series of musical scale frequencies. When performing spectrum analysis to each frame, $x_1$ and $x_2$ are amplitude values corresponding to the frequency values and $f_1$ and $f_2$. $x_M$ is the larger one among $x_1$ and $x_2$, i.e., $x_M = \max(x_1, x_2)$. $x_m$ is the smaller one among $x_1$ and $x_2$, i.e., $x_m = \min(x_1, x_2)$. $f_d$ is an absolute value of a difference between $f_1$ and $f_2$, i.e., $f_d = |f_2 - f_1|$. s is a coefficient, i.e., $s = 0.24/(0.0.207 \min(f_1, f_2) + 18.96)$.

By parsing the audio signal, multiple audio features are obtained. According to different audio features, utilization of the audio signal can be increased and the corresponding vibration signal can also be applied to various application scenarios, thereby expanding application of the vibration signal.

At step 103, at least one vibration feature corresponding to the at least one audio feature is determined.

The at least one vibration feature includes at least one of a vibration intensity, a vibration frequency, and a vibration waveform. It should be noted that the vibration feature may also include other parameter, and the descriptions herein are merely illustrative examples, Which shall not limit the scope of the present disclosure.

In an implementation manner, according to multiple audio features of the audio signal and a preset correspondence between the audio feature and the vibration feature, at least one vibration feature is determined within different beats. For example, the vibration intensity, and/or the vibration frequency, and/or the vibration waveform are correspondingly determined.

In an implementation manner, the vibration feature corresponding to the audio feature of the audio signal is determined according to the preset correspondence between the audio feature and the vibration feature.

For example, the beat duration is inversely proportional to the vibration frequency, and/or inversely proportional to the vibration intensity, and/or proportional to the vibration wavelength; the note ratio is proportional to the vibration frequency, and/or proportional to the vibration intensity, and/or inversely proportional to the vibration wavelength; the audio intensity is proportional to the vibration frequency, and/or proportional to the vibration intensity, and/or inversely proportional to the vibration wavelength; the audio roughness is proportional to the vibration frequency, and/or proportional to the vibration intensity, and/or inversely proportional to the vibration wavelength; the intensity peak is inversely proportional to the vibration frequency, and/or proportional to the vibration intensity, and/or proportional to the vibration wavelength.

It should be noted that the vibration features required in different scenarios can be specifically determined according to at least one correspondence between the audio feature and the vibration feature, thereby expanding application of vibration features. For example, to set an alarm reminder in a cellphone, it is only necessary to determine a correspondence between the beat duration and the note ratio and each vibration feature, or it only requires a correspondence between the beat duration and each vibration feature, or it only requires a correspondence between the note ratio and each vibration feature, then the vibration feature required for the alarm can be easily determined. For example, if the user wants a better vibration experience in a game, the vibration features corresponding to the audio features such as the beat duration, the note ratio, the audio intensity, and the audio roughness need to be determined, so that the user can get a more sophisticated vibration experience in the game and a better gaming experience.

At step 104, a vibration signal corresponding to the audio signal is generated according to the at least one vibration feature.

In an implementation manner, according to a correspondence between the audio feature of the audio signal and the vibration feature of the vibration signal, a corresponding vibration feature is configured for each audio signal, thereby generating a vibration signal corresponding to the audio signal and outputting this vibration signal.

It should be noted that, according to multiple test experiences of converting the audio signal into the vibration signal, an empirical intensity peak ratio can be obtained. A total number of frames of the audio signal being multiplied by the intensity peak ratio is approximately equal to n, where n indicates that there are n intensity peaks in this audio signal. In a case where the total number of frames is a constant, the larger the intensity peak ratio of the audio signal is, the more intensity peaks the audio signal includes; the larger a corresponding audio roughness is and the more intensity peaks the audio signal includes, the stronger the vibration intensity corresponding to the audio signal is; the more intensity peaks the audio signal includes, the smaller the vibration frequency corresponding to the audio signal is and the longer the vibration wavelength corresponding to the audio signal is.

In this embodiment, the inputted audio signal is automatically converted into a vibration signal by the vibration feature corresponding to the audio feature of the inputted audio signal, which can avoid errors caused by manual operation and make the vibration signal possess high versatility.

A second embodiment of the present disclosure relates to a method for audio signal processing. The second embodiment is substantially the same as the first embodiment, and a main difference therebetween is that it further requires to obtain and output a vibration waveform signal based on a motor parameter and the vibration signal that are obtained.

Figure 2:
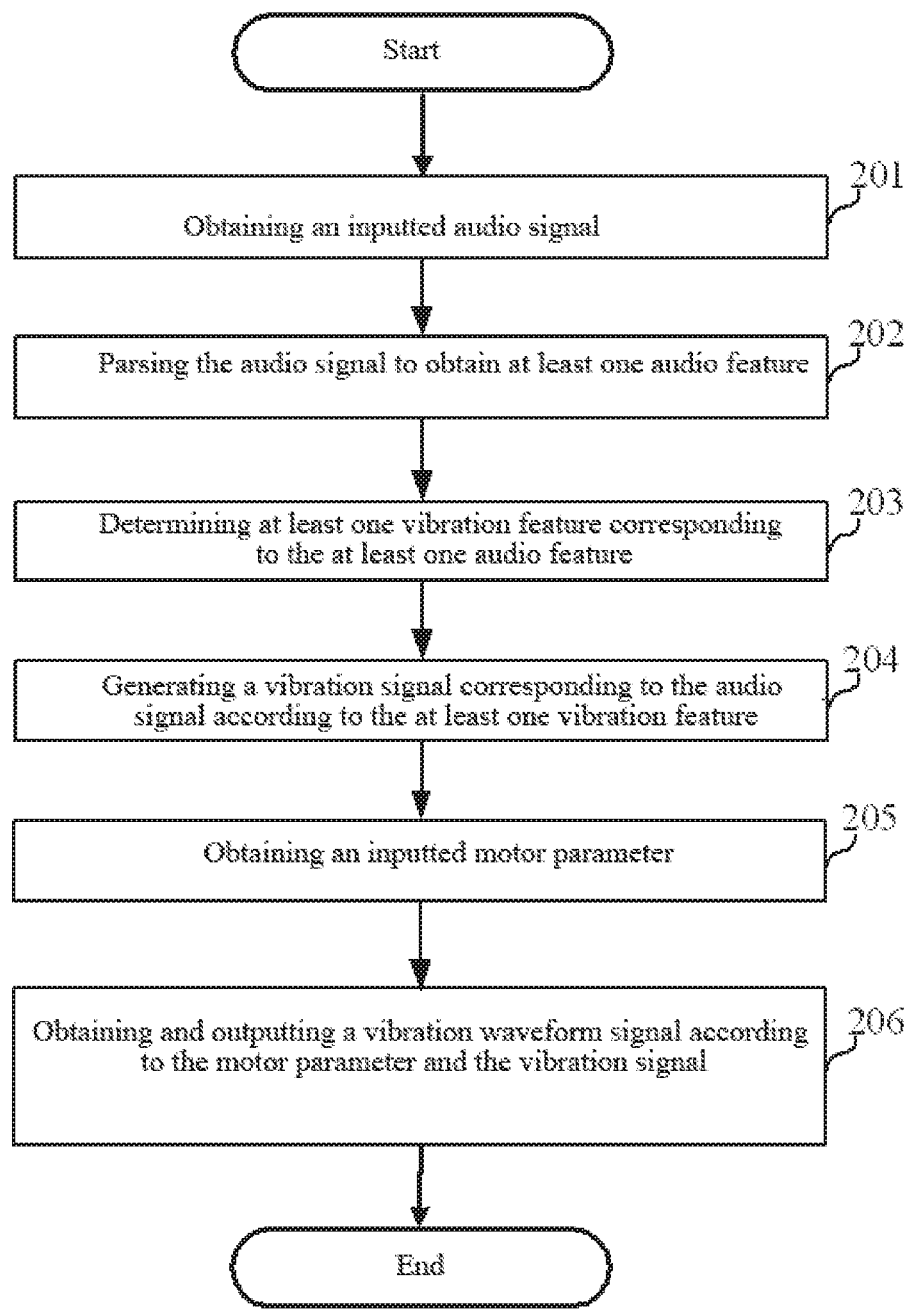
FIG. 2 is a flow block diagram of a method for audio signal processing according to a second embodiment of the present disclosure.

The specific process is as shown in FIG. 2. In this embodiment, the method for audio signal processing includes steps 201 to 206. Since steps 201 to 204 in this embodiment are the same as steps 101 to 104 in the first embodiment, the steps 201 to 204 will not be further described herein. Steps 205 to 206 in this embodiment will be described in the following.

At step 205, an inputted motor parameter is obtained.

It should be noted that the motor parameters mainly include: a motor type, a motor model, a resonance frequency, a shaft diameter, an idle current, a rotation speed, a voltage and other parameters. The motor parameter is configured to better match the vibration signal Different motor parameters correspond to different vibration effects. If the motor parameter matches the vibration signal, the obtained vibration effect is good; on the contrary, if the motor parameter does not match the vibration signal, the obtained vibration effect is relatively poor. For example, when a motor with a resonance frequency of 110 Hz is driven by a sine wave of 170 Hz, the vibration feeling may be weak, and thus the user's experience will be poor.

At step 206, a vibration waveform signal is obtained and outputted according to the motor parameter and the vibration signal.

In an implementation manner, the vibration signal is stored in a database by using the motor parameter as an index. If the vibration waveform signal needs to be obtained, the corresponding vibration signal is retrieved from the database according to the motor parameter, and a motor performance corresponding to the motor parameter is retrieved, so as to calculate the corresponding vibration waveform signal and then output the corresponding vibration waveform signal.

In an implementation mauler, the method is applied to a server, and a terminal device reports the audio signal and the associated motor parameter to the server. The server parses the audio signal according to the method for audio signal processing to obtain the corresponding audio feature, and then the corresponding vibration feature is obtained according to the audio feature, and then the corresponding vibration waveform signal is obtained. Then the server downloads the vibration waveform signal to the terminal device. The motor on the terminal device is driven according to the vibration waveform signal, thereby causing the user of the terminal device to get a vibration feeling.

Figure 3:
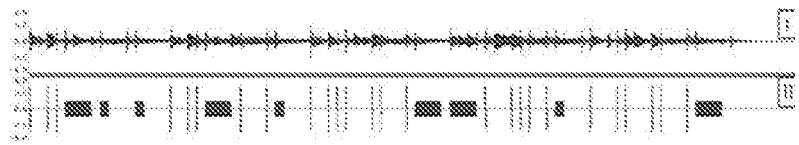
FIG. 3 is a waveform diagram of an audio signal and a vibration signal according to the second embodiment of the present disclosure.

In an implementation manner, the audio signal A is selected as an experimental object to verify the effect of the method for audio signal processing. The waveform of the audio signal is shown as I of FIG. 3, in which a sampling frequency of the audio signal A is 44.1 kHz with a file format ogg. Based on the correspondence between the audio feature of the audio signal and the vibration feature of the vibration signal, parameters of the audio feature of the audio signal are: a beat step of 488 ms, the note ratio of 0.4643, and the intensity peak ratio of 0.2644. According to the vibration feature of the vibration signal, a waveform of the vibration signal is obtained. With reference to II of FIG. 3, comparing the I to II of FIG. 3, it can be determined that the waveform of the vibration signal can well reflect the audio feature of the audio signal.

In this embodiment, according to different motor parameters on different terminals and a combination with the vibration signal, a corresponding vibration waveform signal is obtained. The vibration waveform signal can be adapted to different motors, thereby improving the versatility of the vibration signal.

The steps of each method described above are merely for the sake of clear description, and the steps may also be combined into one step or a certain step may also be divided into multiple sub-steps during implementation. As long as the same logic relation is conformed, it is within the protection scope of the present disclosure. Providing an insignificant modification to an algorithm or process or introducing an insignificant design without changing a core design of the algorithm and processes will fall into the scope of the present disclosure.

A third embodiment of the present disclosure relates to a device for audio signal processing. A specific implementation manner of the device can be referred to the related description in the first embodiment, and the repetition thereof is not further described herein. It should be noted that the implementation of the device in this embodiment can also be referred to the related description in the second embodiment. However, it is not limited to the two embodiments described above, and other unillustrated embodiments are also within the protection scope of the device.

Figure 4:
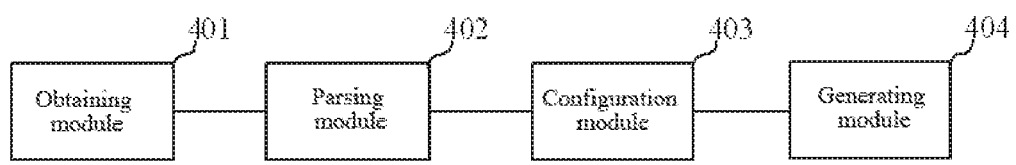
FIG. 4 is a block diagram of a device for audio signal processing according to a third embodiment of the present disclosure.

As shown in FIG. 4, the device mainly includes: an obtaining module 401 configured to obtain an inputted audio signal; a parsing module 402 configured to parse the audio signal to obtain an audio feature; a configuration module 403 configured to determine a vibration feature corresponding to the audio feature; and a generating module 404 configured to generate a vibration signal corresponding to the audio signal according to the vibration feature.

It is not difficult to find that this embodiment is a system embodiment corresponding to the first or second embodiment, and this embodiment can be implemented in cooperation with the first or second embodiment. The related technical details mentioned in the first or second embodiment are still effective in this embodiment and will not be further described herein in order to reduce repetition. Accordingly, the related technical details mentioned in this embodiment can also be applied to the first or second embodiment.

It should be noted that each module in this embodiment is a logic module. In practical applications, a logic unit may be a physical unit, a part of a physical unit, or a combination of multiple physical units. In addition, in order to highlight an innovative part of the present disclosure, this embodiment does not introduce a unit that is not closely related to solving the technical problem proposed by the present disclosure, but this does not mean that there are no other units in this embodiment.

Figure 5:
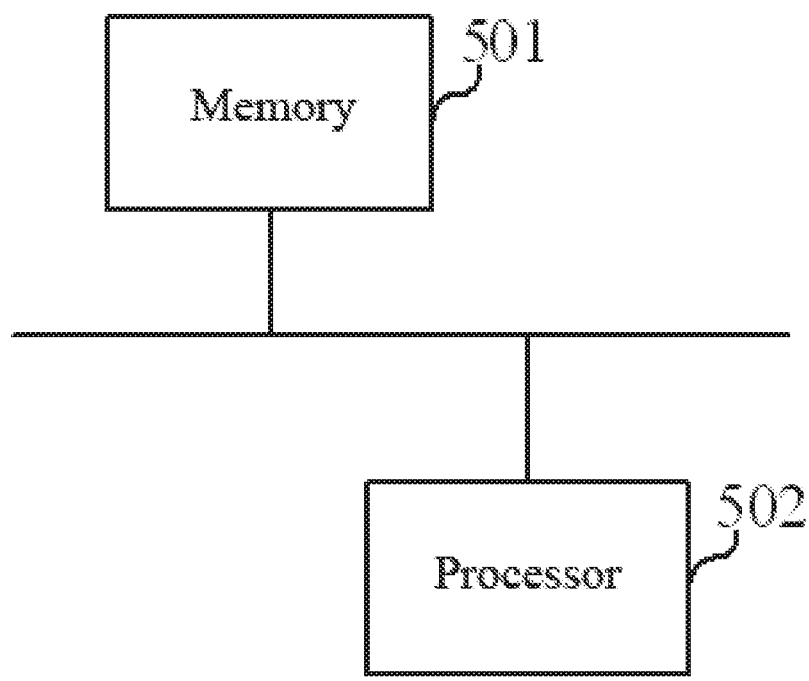
FIG. 5 is a structural schematic diagram of an electronic device according to a fourth embodiment of the present disclosure.

A fourth embodiment of the present disclosure provides an electronic device, and a structure of the device is as shown in FIG. 5. At least one processor 501 and a memory 502 communicated to the at least one processor 501 are included. The memory 502 stores instructions executable by the at least one processor 501, and the instructions are executed by the at least one processor 501, so that the at least one processor 501 can perform the method for audio signal processing described in the first or second embodiment.

In this embodiment, the processor 501 is exemplified by a central processing unit (CPU), and the memory 502 is exemplified by a random access memory (RAM). The processor 501 and the memory 502 can be connected by a bus or by other means. In FIG. 5, a bus connection is taken as an example. The memory 502 is used as a non-volatile computer readable storage medium for storing a non-volatile software program, a non-volatile computer-executable program and a module. For example, the program for implementing the method for audio signal processing in this embodiment of the present disclosure is stored in the memory 502. The processor 501 performs various functional applications and data processing of the device by running the non-volatile software program, instructions, and module stored in the memory 502, thereby implementing the method for audio signal processing described above.

The memory 502 may include a program storage zone and a data storage zone. The program storage zone may store an operating system, and an application required for at least one function. The data storage zone may store a list of options and the like. In addition, the memory 502 may include a high-speed random access memory, and may also include a non-volatile memory, such as at least one disk memory device, a flash memory device, or other non-volatile solid state memory device. In some embodiments, the memory 502 optionally includes a memory remote from the processor 501, and these memories can. be connected to an external device via a network.

One or more program modules are stored in memory 502, and when being executed by one or more processors 501, the method for audio signal processing in any of the above-mentioned method embodiments is performed.

The above-mentioned product can implement the method provided by the embodiments of the present disclosure, and has the functional modules implementing the method and the beneficial effects. Technical details that are not described in this embodiment can be referred to the method provided by the embodiments of the present disclosure.

A fifth embodiment of the present disclosure relates to a computer readable storage medium, in which a computer program is stored. When the computer program is executed by the processor, the method for audio signal processing in any of the method embodiments of the present disclosure can be implemented.

It will be understood by those skilled in the art that all or part of the steps of the above-mentioned embodiments may be implemented by a program instructing a related hardware. The program is stored in a storage medium, and includes a plurality of instructions for making a device (such as a microcontroller, a chip) or processor execute all or part of the steps of the method described in various embodiments of the present disclosure. The above-mentioned storage medium includes any medium that can store program codes, such as a U disk, a mobile hard disk, a read-only memory (ROM), a random access memory (RAM), a diskette or an optical disk.

It should be understood by those skilled in the art that the above embodiments are merely some specific embodiments of the present disclosure, and various changes in form and details may be made without departing from the scope of the present disclosure.

What is claimed is:

1. A method for audio signal processing, comprising steps of:
   obtaining an inputted audio signal;
   parsing the audio signal to obtain at least one audio feature;
   determining at least one vibration feature corresponding to the at least one audio feature; and
   generating a vibration signal corresponding to the audio signal according to the at least one vibration feature,
   wherein the at least one audio feature comprises at least one of a beat duration, a note ratio, an audio intensity, an audio roughness and an intensity peak of the audio signal; the at least one vibration feature comprises at least one of a vibration intensity, a vibration frequency and a vibration waveform, wherein the beat duration is inversely proportional to the vibration frequency and/or inversely proportional to the vibration intensity and/or directly proportional to the vibration wavelength; the note ratio is directly proportional to the vibration frequency and/or directly proportional to the vibration intensity and/or inversely proportional to the vibration wavelength; the audio intensity is directly proportional to the vibration frequency and/or directly proportional to the vibration intensity and/or inversely proportional to the vibration wavelength; the audio roughness is directly proportional to the vibration frequency and/or directly proportional to the vibration intensity and/or inversely proportional to the vibration wavelength; the intensity peak is inversely proportional to the vibration frequency and/or directly proportional to the vibration intensity and/or directly proportional to the vibration wavelength,
   wherein the step of parsing the audio signal to obtain at least one audio feature comprises:
      dividing the audio signal into a plurality of segments, and then respectively calculating a speed, a number of notes, and a spectral relationship of each of the plurality of segments of the audio signal;
      determining a beat duration of each of the plurality of segments of the audio signal according to the speed of each of the plurality of segments of the audio signal; and/or,
      determining a note ratio of each of the plurality of segments of the audio signal according to the number of notes of each of the plurality of segments of the audio signal and the duration of each of the plurality of segments of the audio signal; and/or,
      determining an audio intensity of each of the plurality of segments of the audio signal according to the spectral relationship of each of the plurality of segments of the audio signal; and/or,
      determining an audio roughness of each of the plurality of segments of the audio signal according to the spectral relationship of each of the plurality of segments of the audio signal; and/or,
      determining the intensity peak of each of the plurality of segments of the audio signal according to a total number of frames of each of the plurality of segments of the audio signal and a ratio of the intensity peak of each of the plurality of segments of the audio signal.

2. The method for audio signal processing as described in claim 1, wherein the step of determining at least one vibration feature corresponding to the at least one audio feature comprises: determining the at least one vibration feature corresponding to the at least one audio feature of the audio signal according to a preset correspondence between the at least one audio feature and the at least one vibration feature.

3. The method for audio signal processing as described in claim 1, comprising after the step of generating the vibration signal corresponding to the audio signal according to the at least one vibration feature:

obtaining an inputted motor parameter;

obtaining and outputting a vibration waveform signal according to the motor parameter and the vibration signal.

4. An electronic device, comprising:

at least one processor; and a memory communicatively connected with the at least one processor;

wherein the memory stores instructions executable by the at least one processor, the instructions, when being executed by the at least one processor, cause the at least one processor to perform the method for audio signal processing as described in claim 1.

5. A non-transitory computer readable storage medium storing a computer program, wherein the computer program, when being executed by a processor, cause the processor to implement the method for audio signal processing as described in claim 1.

* * * * *